Jan. 25, 1938.  J. C. HOSTETTER  2,106,527
REFRACTORY FOR CONTACTING MOLTEN GLASS
Filed June 27, 1936
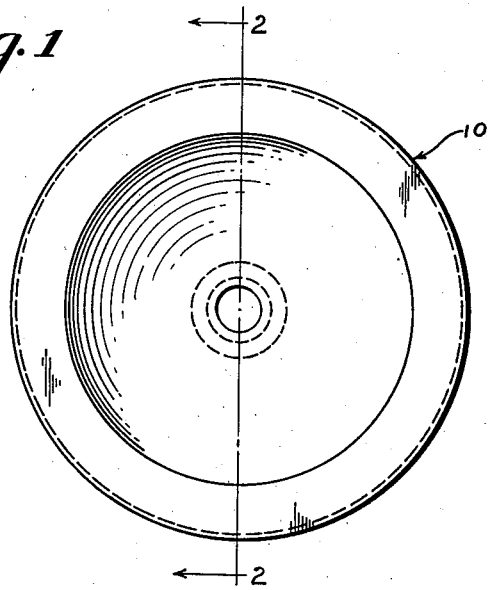
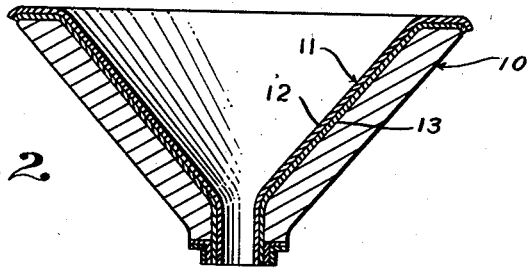
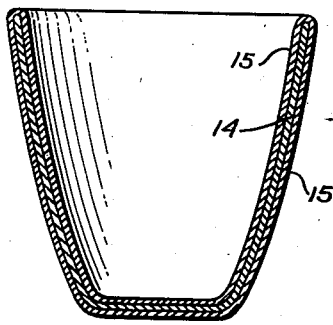
INVENTOR.
John C. Hostetter
BY Dorsey & Cole
ATTORNEYS.

Patented Jan. 25, 1938

2,106,527

UNITED STATES PATENT OFFICE 2,106,527

REFRACTORY FOR CONTACTING MOLTEN GLASS

John C. Hostetter, Corning, N. Y., assignor to Corning Glass Works, Corning, N. Y., a corporation of New York Application June 27, 1936, Serial No. 87,781

8 Claims. (Cl. 49—55)

This invention relates to refractory articles for contact with molten glass and more particularly to refractory parts such as feeders, pots, crucibles, tanks, needles, orifice rings, bushings, and other devices for use with molten glass held at such high temperatures as to flow by gravity and wet metal.

Such refractory parts which are in contact with the flowing glass have heretofore been composed of special clay refractories, usually high in alumina. Inasmuch as flowing molten glass exerts considerable frictional effect and corrosive attack upon the refractories, contamination of the glass has resulted and it has not been possible to maintain constant dimensions.

Because of its ductility pure platinum can readily be fabricated into various intricate shapes by forging without crystallizing the metal or causing undue strain therein and has been used to some extent for the purposes mentioned. However, platinum in such service has not been entirely successful because at the high temperatures required, it volatilizes rapidly and is too soft to maintain its shape unless supported. Were it not for these disadvantages platinum would be an ideal material for this purpose.

To overcome these difficulties, it has been common practice to use an alloy of platinum and rhodium, the rhodium serving to stiffen the platinum and to retard its volatilization. The use of this alloy has to a large extent overcome the above mentioned difficulties but inasmuch as rhodium is a hard metal which cannot be readily forged, its alloys with platinum become increasingly more difficult to forge as the rhodium content is increased. Hence it is extremely difficult to form intricate shapes consisting entirely of a platinum rhodium alloy having a sufficiently high rhodium content to attain the desired result.

The object of this invention is a glass contacting refractory metal body so constructed that volatilization of the metal is prevented and its rigidity preserved.

Among its features the invention embodies a refractory body of platinum metal having on the areas exposed to the atmosphere a layer of rhodium or platinum-rhodium alloy which is united thereto and forms an integral part thereof.

I have found that pure platinum bodies at high temperatures do not volatilize appreciably when in contact with molten glass but that appreciable losses are experienced through volatilization which occur on the surface or surfaces which contact the supporting refractory or are exposed to the atmosphere. By uniting a layer of rhodium or of platinum-rhodium alloy to the surface of the platinum which contacts the supporting refractory and keeping the exposed surface of the platinum covered with molten glass, this difficulty is overcome and volatilization of the platinum is prevented.

The most convenient way of laminating platinum with rhodium is by electroplating, although other methods may be devised. The platinum is first forged into the desired shape, such as a bushing, jet, nozzle, or orifice ring, and the rhodium is electroplated on the platinum in the manner well known in the art. The rhodium plating may be restricted or confined to any particular part of the surface of the platinum form, for example, to that portion of the form which is exposed to the air, or the entire form both inside and out may be plated. Since rhodium is much stiffer than its alloys, a comparatively thin layer thereof serves to reinforce the platinum and to protect it from volatilization loss and the strength of the article may be greatly enhanced by increasing the thickness of the reenforcing and protecting layer which may be readily accomplished by lengthening the time of plating.

In reenforcing and protecting the platinum form with an alloy of platinum and rhodium, the usual methods of forging such alloys are employed. The alloy preferably should contain only sufficient rhodium to provide adequate reenforcement and protection against volatilization losses because, as the rhodium content is increased, the workability of the alloy becomes more difficult. For my purpose, I use a layer of the alloy which need be only thick enough to reenforce and protect the platinum layer adequately.

For a better understanding of my invention, reference is had to the accompanying drawing which illustrates one embodiment of my invention and in which:

Fig. 1 is a plan view of an orifice ring with central nozzle for delivering molten glass;

Fig. 2 is a vertical section on the line 2—2 of Fig. 1 showing, on a greatly exaggerated scale, a laminated refractory liner formed of platinum and reenforced and protected by a platinum-rhodium alloy; and Fig. 3 is a vertical section of a crucible embodying another form of my invention.

In carrying my invention into practice with respect to glass contacting parts which are to be continuously covered or in contact with molten glass, I employ a body of platinum which may be readily forged and otherwise made to conform to the desired shape and cover its surfaces which do not contact with glass with a reenforcing and protecting layer of platinum-rhodium alloy. For example, in Figs. 1 and 2 an orifice ring, designated generally 10, composed of highly refractory materials is provided with a close fitting metallic liner, designated generally 11, composed of an inner body 12 of platinum, one surface of which is continuously submerged in molten glass and an outer cover 13 of platinum-rhodium alloy which reenforces the body 12 and prevents volatilization thereof. Alternatively the cover 13 may be composed of rhodium which is plated on to the platinum body 12.

Glass contacting parts, which are intermittently exposed to the air at high temperatures are preferably composed of platinum reenforced and protected on all surfaces with rhodium or platinum-rhodium alloy. As an example of this there is shown in Fig. 3 a crucible composed of a body 14 of platinum which is covered both inside and out with a continuous layer 15 of rhodium or platinum-rhodium alloy which serves to reenforce the body and protect it from volatilization.

I claim:

1. In the production of glassware a metal part for contact with molten glass comprising a body of platinum having on that surface which is not in contact with the glass a rhodium containing casing which is integral with the platinum.

2. In the production of glassware a metal part for contact with molten glass which comprises a body of platinum having on that surface which is not in contact with the glass a casing which consists of an alloy of platinum and rhodium and which is integral with the platinum.

3. In a device for delivering molten glass an orifice ring comprising a body of refractory clay and a metal liner for contacting the molten glass, said liner being composed of platinum reenforced and protected on the surface which contacts the refractory by a rhodium containing casing which is integral with the platinum.

4. In a device for delivering molten glass an orifice ring comprising a body of refractory clay and a metal liner for contacting the molten glass, said liner being composed of platinum reenforced and protected on the surface which contacts the refractory by a layer of platinum-rhodium alloy which is integral with the platinum.

5. In a device for delivering molten glass an orifice ring comprising a body of refractory clay and a metal liner for contacting the molten glass, said liner being composed of platinum reenforced and protected on the surface which contacts the refractory with a layer of rhodium which is integral with the platinum.

6. A container for molten glass consisting of platinum which is reenforced and protected both inside and outside with a casing integral with the platinum and containing rhodium.

7. A container for molten glass consisting of platinum reenforced and protected both inside and outside with a casing which consists of rhodium and which is integral with the platinum.

8. A container for molten glass consisting of platinum reenforced and protected both inside and outside with a casing which consists of a platinum-rhodium alloy and which is integral with the platinum.

JOHN C. HOSTETTER.